United States Patent
Ober et al.

[11] Patent Number: 6,021,094
[45] Date of Patent: Feb. 1, 2000

[54] METHOD OF MIGRATING SEISMIC RECORDS

[75] Inventors: Curtis C. Ober, Las Lunas; Louis A. Romero, Albuquerque, both of N.Mex.; Dennis C. Ghiglia, Longmont, Colo.

[73] Assignee: Sandia Corporation, Albuquerque, N.Mex.

[21] Appl. No.: 09/264,213

[22] Filed: Mar. 5, 1999

Related U.S. Application Data

[60] Provisional application No. 60/110,837, Dec. 3, 1998.

[51] Int. Cl.$^7$ .................................................... G01V 1/36
[52] U.S. Cl. .............................. 367/53; 367/50; 367/63
[58] Field of Search .................................. 367/50, 63, 59, 367/68, 51, 53; 364/421

[56] References Cited

U.S. PATENT DOCUMENTS

| | | | |
|---|---|---|---|
| 4,745,585 | 5/1988 | Larner | 367/50 |
| 4,953,142 | 8/1990 | Rimmer | 367/73 |
| 5,138,584 | 8/1992 | Hale | 367/53 |
| 5,153,857 | 10/1992 | Wang | 367/50 |
| 5,198,979 | 3/1993 | Moorhead et al. | 367/38 |
| 5,233,569 | 8/1993 | Beasley et al. | 367/53 |
| 5,424,743 | 6/1995 | Ghiglia et al. | 367/25 |
| 5,530,679 | 6/1996 | Albertin | 367/68 |
| 5,544,126 | 8/1996 | Berryhill | 367/52 |
| 5,648,937 | 7/1997 | Campbell | 367/27 |
| 5,696,735 | 12/1997 | Krebs | 367/50 |
| 5,737,220 | 4/1998 | Miller | 364/421 |

OTHER PUBLICATIONS

Scott A. Morton, Amerada Hess Corporation, and Curtis C. Ober, Sandia National Laboratories, Faster Shot–Record Depth Migrations Using Phase Encoding.

Mike Lorentz and Robert Bradley, "An Introduction to Migration," Seismic Migration web site: http://tellus-.geol.Isu.edu/html..7/rcbradley/www/rebradley1.html.

J. Louie, Feb. 2, 1997, "What is Seismic Migration?," web site: http://www.seismo.unr.edu/cemat/migration.html.

*Primary Examiner*—Christine K. Oda
*Assistant Examiner*—Anthony Jolly
*Attorney, Agent, or Firm*—V. Gerald Grafe

[57] ABSTRACT

The present invention provides a method of migrating seismic records that retains the information in the seismic records and allows migration with significant reductions in computing cost. The present invention comprises phase encoding seismic records and combining the encoded seismic records before migration. Phase encoding can minimize the effect of unwanted cross terms while still allowing significant reductions in the cost to migrate a number of seismic records.

26 Claims, 17 Drawing Sheets

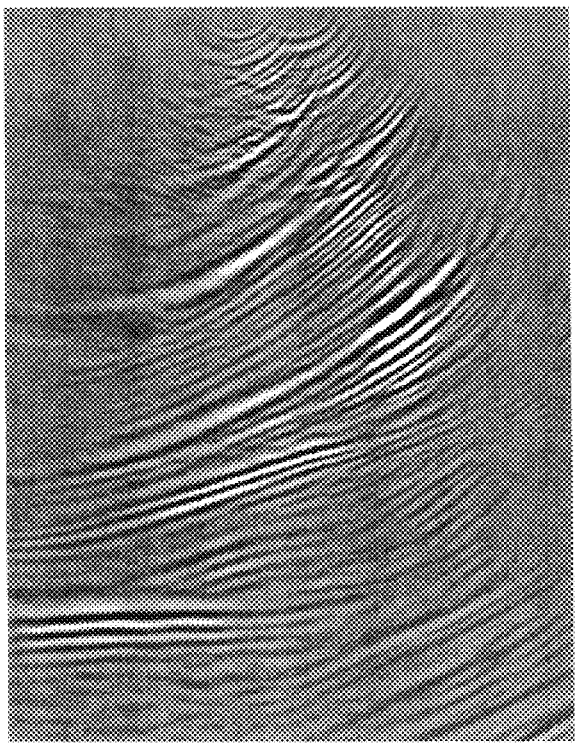
Figure 3: Two shots of the Marmousi Model using conventional imaging and stacking (i.e., one migration for each shot).

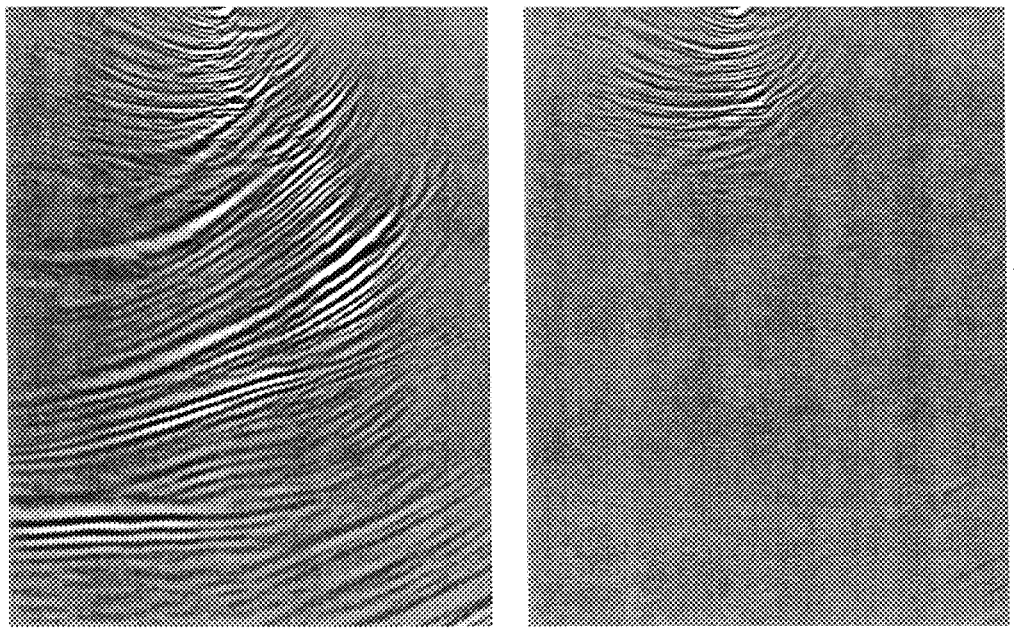
Figure 4a: Two shots of the Marmousi Model using linear phase shift $t_o = 1.792$. On the left is the encoded image, and on the right is the difference between the conventional image in Figure 3 and the encoded image.

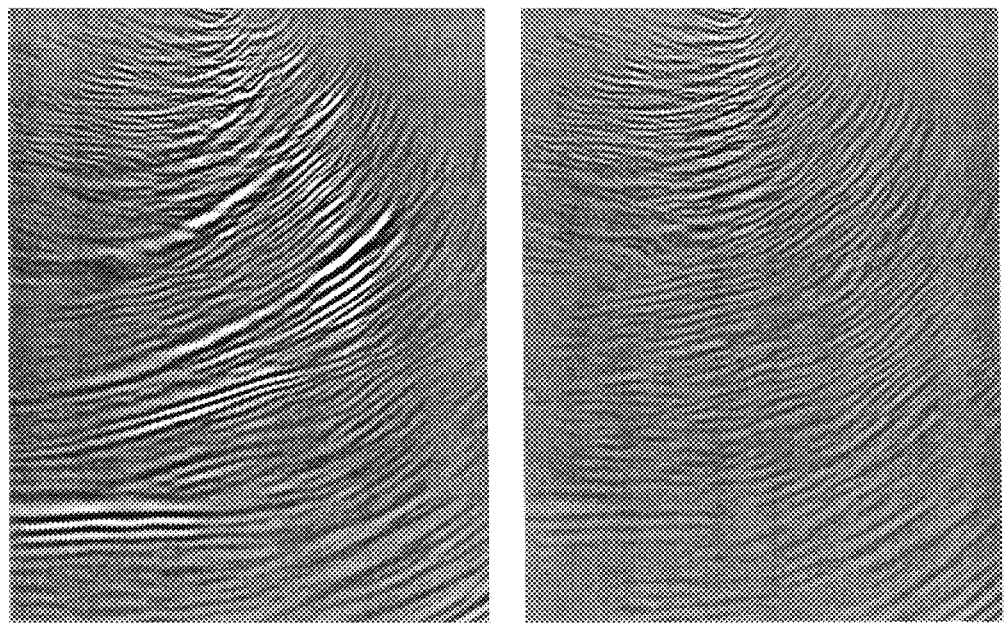
Figure 4b: Two shots of the Marmousi Model using random encoding. On the left is the encoded image, and on the right is the difference between the conventional image in Figure 3 and the encoded image.

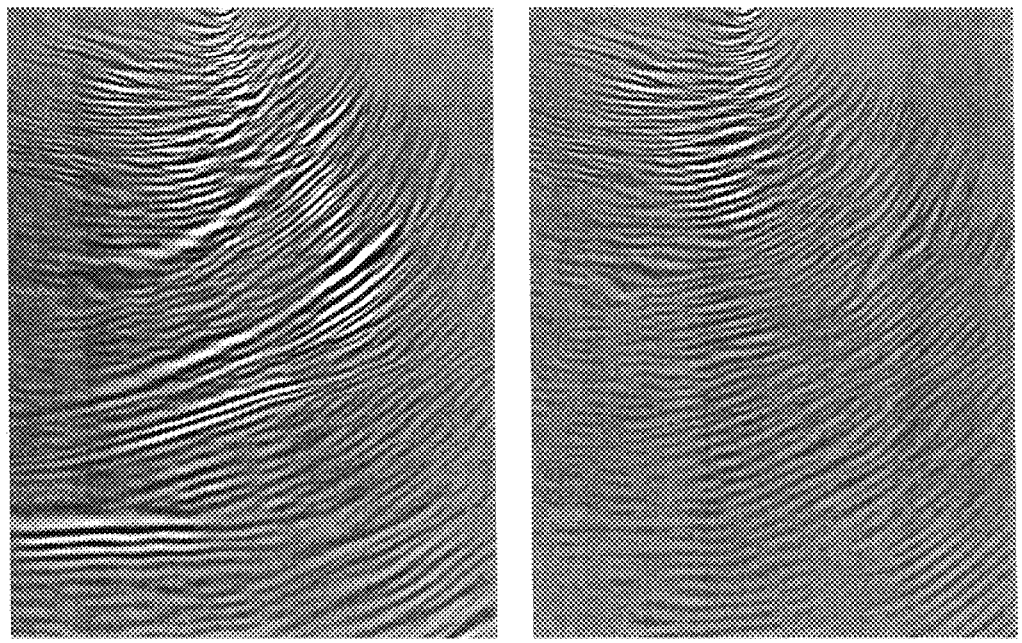
Figure 4c: Two shots of the Marmousi Model using chirp encoding. On the left is the encoded image, and on the right is the difference between the conventional image in Figure 3 and the encoded image.

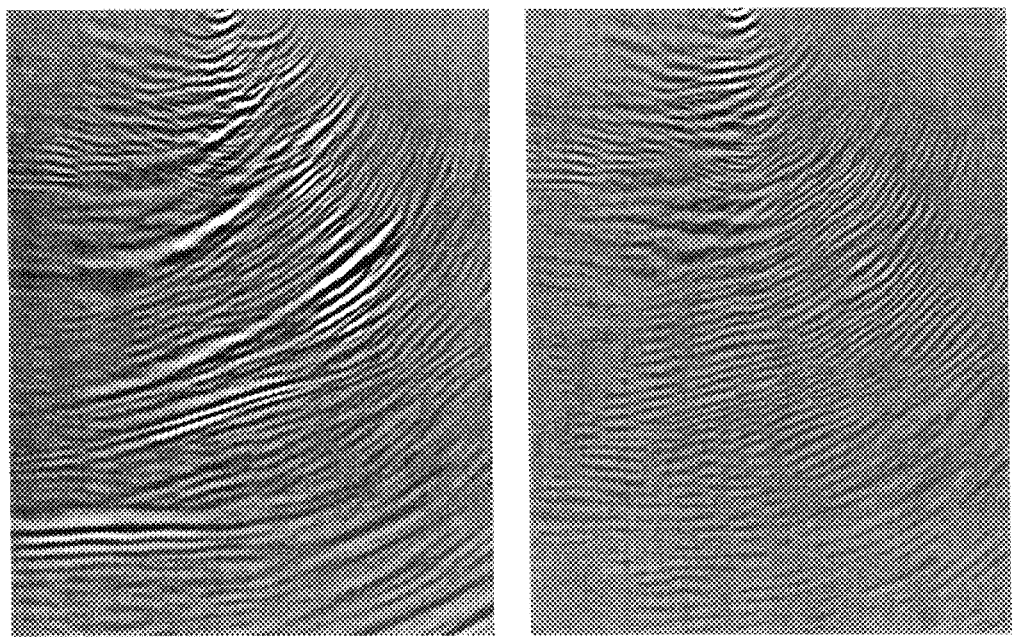
Figure 4d: Two shots of the Marmousi Model using modified-chirp encoding. On the left is the encoded image, and on the right is the difference between the conventional image in Figure 3 and the encoded image.

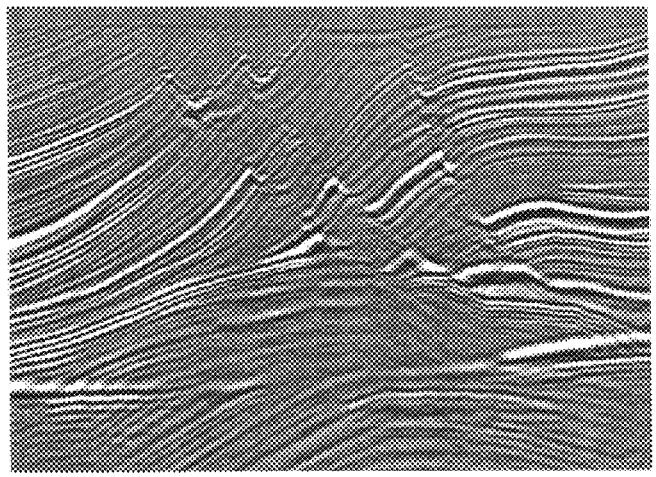
Figure 5: The Marmousi model migrated with 240 shots using conventional imaging and stacking (i.e., one shot per migration).

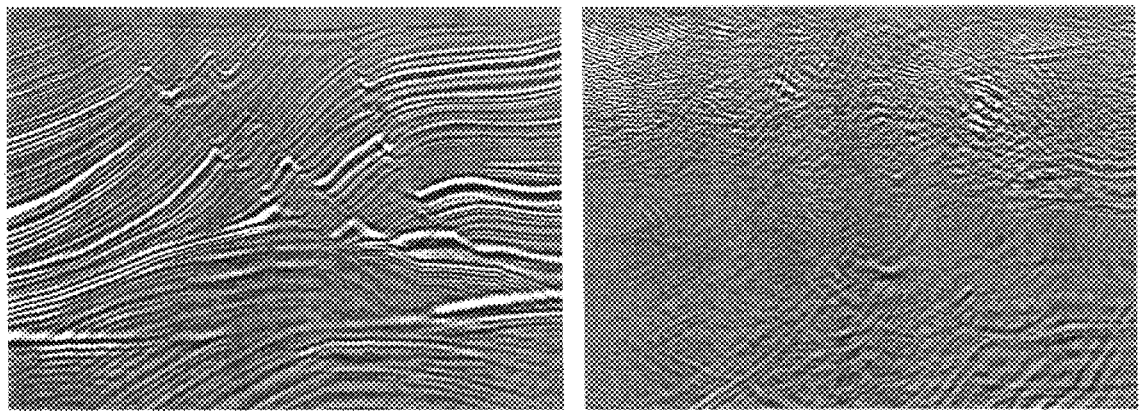
Figure 6a: The Marmousi model combining 2 shots per migration using linear phase shift. On the left is the encoded image, and on the right is the difference (amplified by a factor of 10) between the conventional image in Figure 5 and the encoded image.

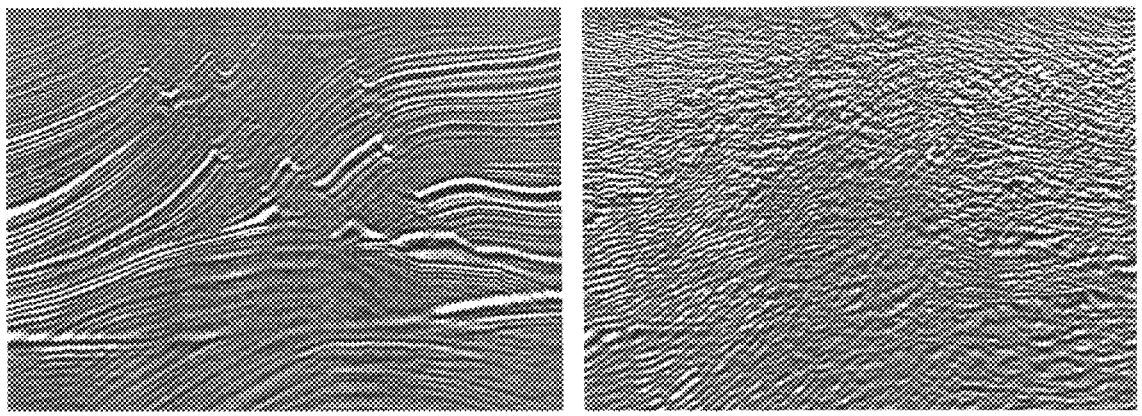
Figure 6b: The Marmousi model combining 2 shots per migration using random encoding. On the left is the encoded image, and on the right is the difference (amplified by a factor of 10) between the conventional image in Figure 5 and the encoded image.

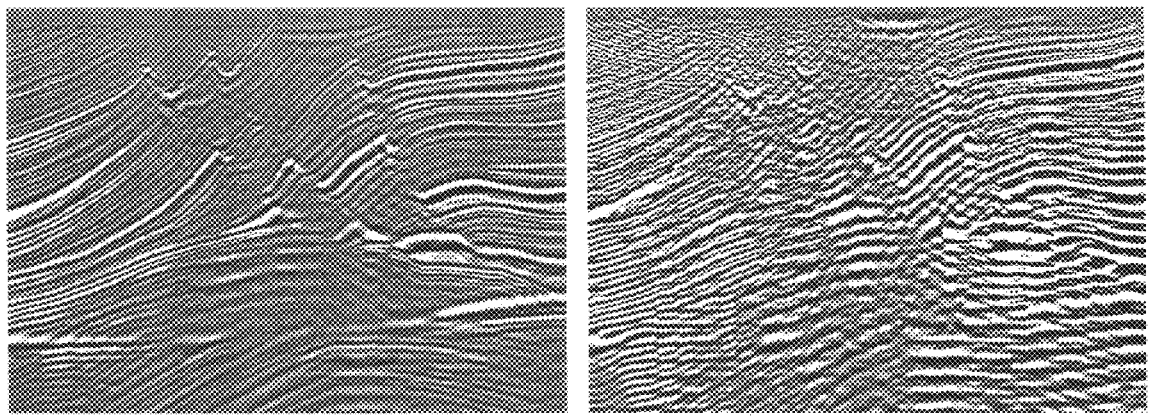
Figure 6c: The Marmousi model combining 2 shots per migration using chirp encoding. On the left is the encoded image, and on the right is the difference (amplified by a factor of 10) between the conventional image in Figure 5 and the encoded image.

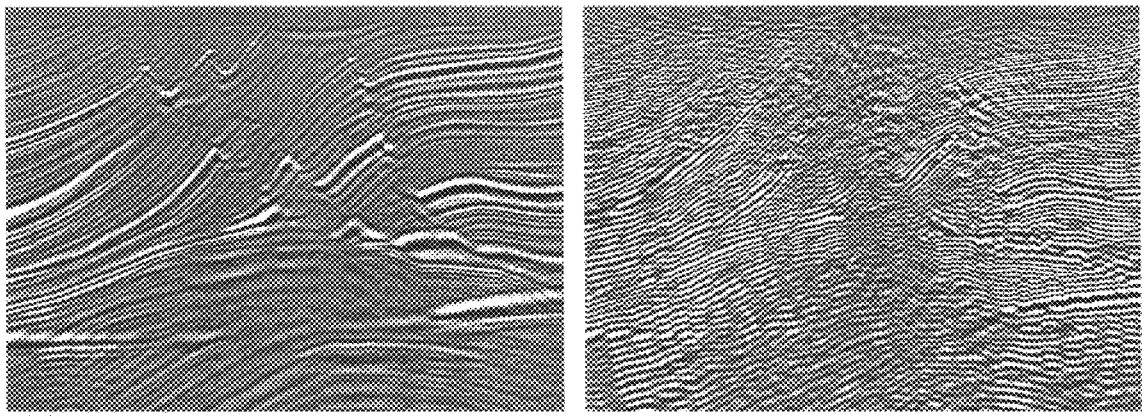
Figure 6d: The Marmousi model combining 2 shots per migration using modified-chirp encoding. On the left is the encoded image, and on the right is the difference (amplified by a factor of 10) between the conventional image in Figure 5 and the encoded image.

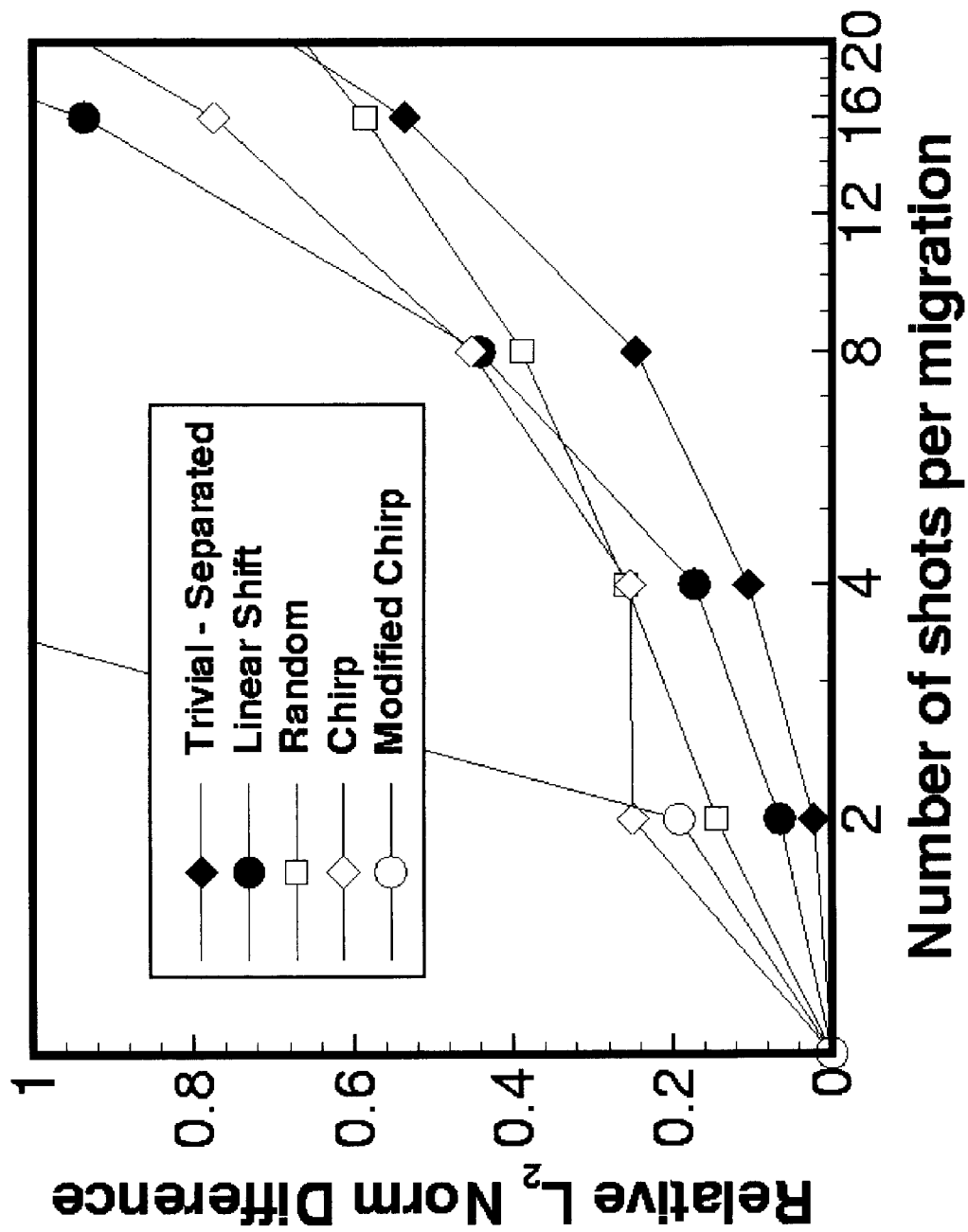
Figure 7: $L_2$-norm difference between the conventional image in Figure 5 and the various encoding schemes.

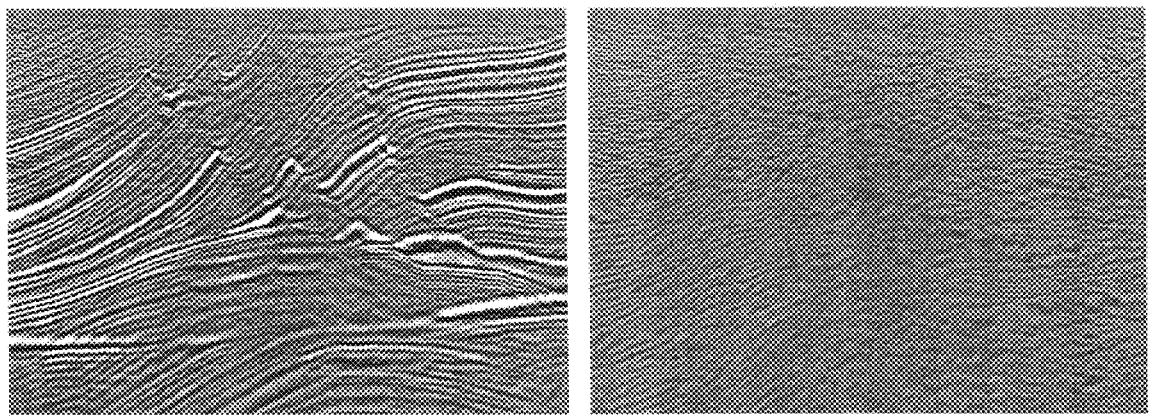
Figure 8a: The Marmousi model using random encoding and combining 4 shots per migration. On the left is the encoded image, and on the right is the difference between the conventional image in Figure 5 and the encoded image.

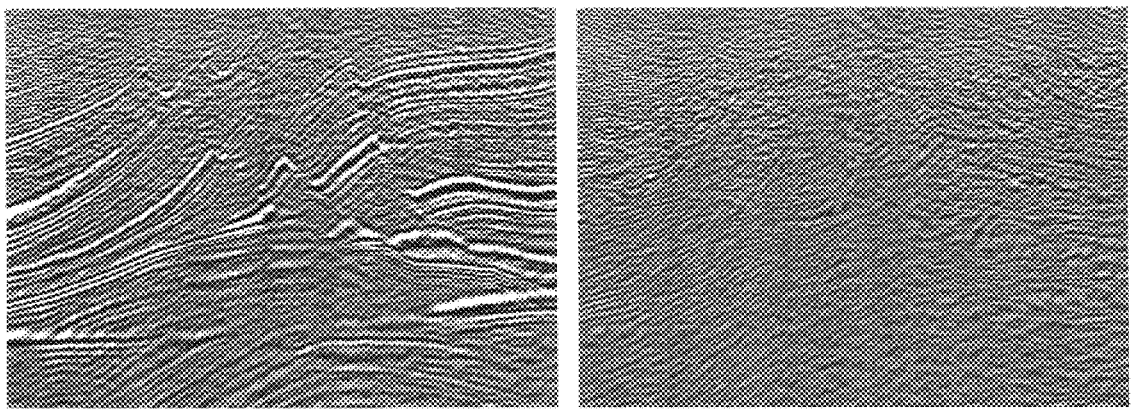
Figure 8b: The Marmousi model using random encoding and combining 16 shots per migration. On the left is the encoded image, and on the right is the difference between the conventional image in Figure 5 and the encoded image.

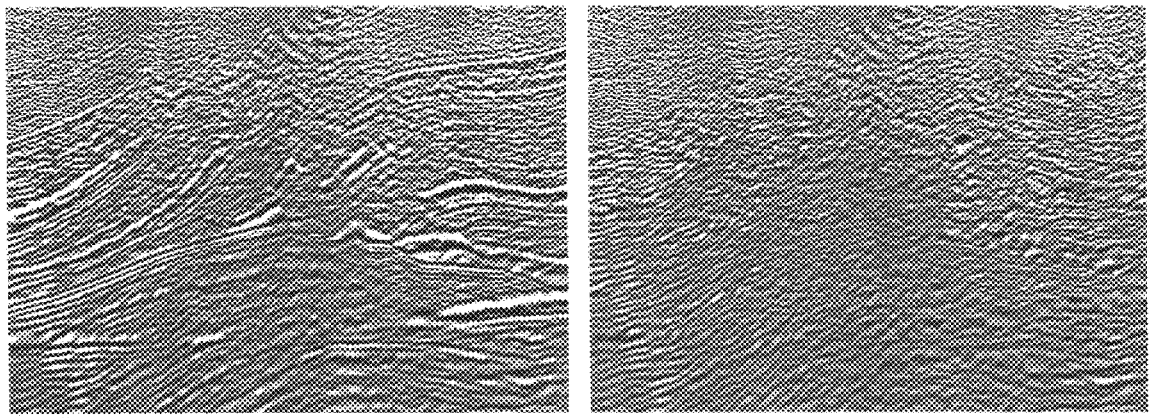
Figure 8c: The Marmousi model using random encoding and combining 60 shots per migration. On the left is the encoded image, and on the right is the difference between the conventional image in Figure 5 and the encoded image.

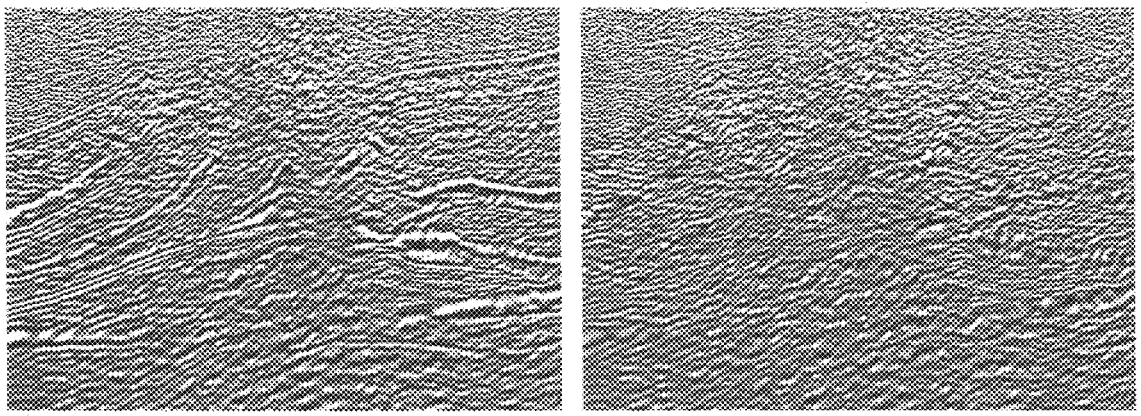
Figure 8d: The Marmousi model using random encoding and combining 240 shots per migration. On the left is the encoded image, and on the right is the difference between the conventional image in Figure 5 and the encoded image.

METHOD OF MIGRATING SEISMIC RECORDS

This application claims the benefit of provisional application No. 60/110,837, filed Dec. 3, 1998. +gi This invention was made with Government support under Contract DE-AC04-94AL85000 awarded by the U.S. Department of Energy. The Government has certain rights in the invention.

BACKGROUND OF THE INVENTION

This invention relates to the field of migration of seismic records, specifically reducing the cost of pre-stack migration of a plurality of seismic records by phase encoding and combining selected records before migration. As used herein, a seismic record includes shot gathers (a single source trace and multiple receiver traces), receiver gathers (a single receiver trace and multiple source traces), common offset gathers, and other combinations of source and receiver traces.

Complex subsurface conditions preclude simple stacking of seismic records. Complex subsurface conditions can scatter seismic waves in unexpected directions; simple stacking can show subsurface features in the wrong locations.

Migration of seismic records can provide more accurate location of subsurface features. Migration involves geometric repositioning of return signals to show an event (layer boundary or other structure) in its proper location. Pre-stack migration, or migration of seismic records before stacking into a single image, can provide the most accurate information.

Pre-stack migration techniques include Kirchoff migration, Stolt migration, finite-difference migration, Fourier finite-difference migration, phase-shift migration, Gazdag migration, split-step migration, phase shift plus interpolation, and reverse-time migration. See, e.g., Claerbout, Jon F., "Imaging the Earth's Interior", Blackwell Scientific Publications, Boston, 1985; Scales, John A., "Theory of Seismic Imaging", Samizdat Press, hilbert.mines.colorado.edu, 1994; Stolt, Robert H. and Benson, Alvin K., "Seismic Migration, Theory and Practice, Vol. 5", Handbook of Geophysical Exploration, Section I. Seismic Exploration, Geophysical Press, London, 1986; Yilmaz, O., "Seismic Data Processing, Investigations in Geophysics No. 2", Society of Exploration Geophysicists, P.O. Box 702740, Tulsa, Okla. 74170-2740, 1987.

All of these methods are expensive, however, especially when applied to seismic surveys comprising hundreds or thousands of seismic records. The expense can be mitigated by using post-stack migration, at the expense of accuracy in the final image. The expense can also be mitigated by using only subsets of the total number of seismic records, but at the cost of the information contained in the unused records.

Accordingly, there is a need for methods to reduce the cost of migrating seismic records, without losing information contained in the plurality of seismic records or reducing the image quality.

SUMMARY OF THE INVENTION

The present invention provides a method of seismic record migration that reduces the cost of migration by migrating multiple seismic records in a single migration. Combining multiple seismic records before migration can produce cross terms between unrelated shot and receiver fields, generating unwanted artifacts in the final image. The present invention phase encodes each seismic record before combination, effectively dispersing the cross terms. Each seismic record is phase encoded, then the phase encoded seismic records are combined and a frequency-domain migration performed on the combined record. Parseval's inequality implies a one-to-one correspondence between frequency domain migration and time-domain migration. Using this correspondence allows the technique of phase encoding to be applied to time and reverse-time migration.

The present invention contemplates several phase encoding schemes, including random phase encoding, linear phase encoding, chirp phase encoding, and modified chirp phase encoding. The present invention allows combination of two seismic records for migration with introduction of only slight artifacts. The present invention allows combination of more than two seismic records with the errors associated with cross terms growing only slowly with each added seismic record.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 3 is an image generated by conventional migration and stacking of two seismic records from the Marmousi model.

FIG. 4($a,b,c,d$) are images generated using migration according to the present invention.

FIG. 5 is an image generated by conventional migration and stacking of all 240 seismic records of the Marmousi model.

FIG. 6($a,b,c,d$) are images generated using migration according to the present invention of all 240 seismic records of the Marmousi model.

FIG. 7 is a graph of the L2 norm difference between the image of FIG. 5 and the images of FIG. 6($a,b,c,d$).

FIG. 8($a,b,c,d$) are images generated using migration according to the present invention of all 240 seismic records of the Marmousi model.

DETAILED DESCRIPTION OF THE INVENTION

Figure 1:
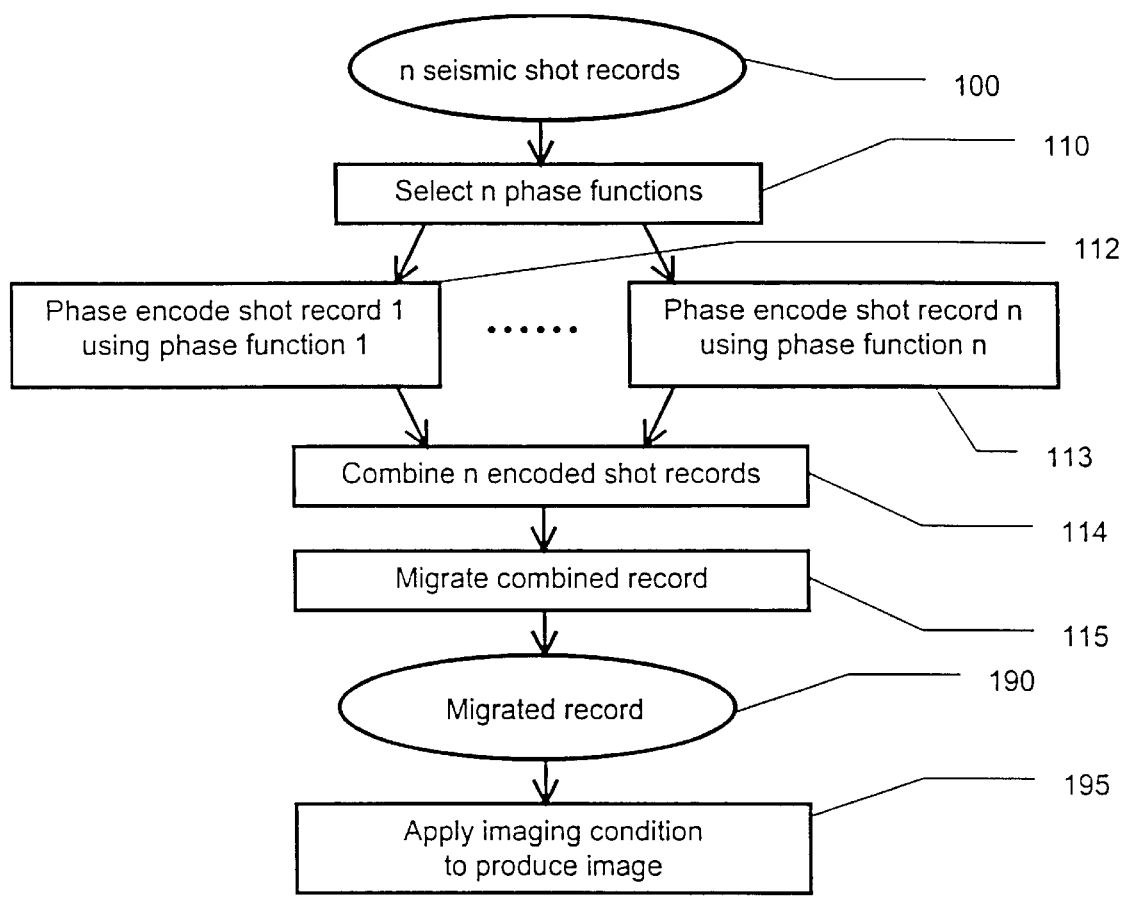
FIG. 1 is a flow diagram of the method of the present invention.

The present invention provides a method of migrating seismic records that retains the information in the seismic records and allows migration with significant reductions in computing cost. The present invention comprises phase encoding seismic records and combining the encoded records before migration. Phase encoding can minimize the effect of unwanted cross terms while still allowing significant reductions in the cost to migrate a number of seismic records.

Seismic trace data can be Fourier transformed to give source and receiver wavefields $S_i(x,y,z=0,\omega)$ and $R_i(x,y,z$ $=0,\omega)$ at the surface. These wavefields can be propagated into the earth's interior using the one-way wave equation to determine $S_1(\underline{x},\omega)$ and $R_1(\underline{x},\omega)$ where $\underline{x}=(x,y,z)$ is the position vector and $\omega$ is the Fourier transform variable. An image can be produced using the imaging condition of Equation 1.

$$I_1(\underline{x}) = \sum_{k=1}^{N\omega} S_1^*(\underline{x},\omega_k) R_1(\underline{x},\omega_k) \qquad \text{Equation 1}$$

In Equation 1, $\omega_k$ are the frequencies being processed, $N_\omega$ is the number of frequencies, and $S_1^*$ is the complex conjugate of $S_1$. Equation 1 represents a crosscorrelation of two signals in the time (or space) domain. The final image can be obtained by summing the images from many different seismic records, as in Equation 2.

$$I(\underline{x}) = I_1(\underline{x}) + I_2(\underline{x}) + \qquad \text{Equation 2}$$

The time to process the full image is proportional to the total number of seismic records that are processed. The present invention combines seismic records, reducing the overall cost to produce the final image. First, note that the differential equations, acoustic wave equations, solved to obtain S and R are linear, and therefore the summed wavefields, $S_s$ and $R_s$, in Equation 3 can be calculated by the differential equations in nearly the same time it takes to compute any of the individual terms S or R.

$$S_s(\underline{x},\omega) = \sum_i a_i S_i(\underline{x},\omega) \text{ and} \qquad \text{Equation 3}$$

$$R_s(\underline{x},\omega) = \sum_i a_i R_i(\underline{x},\omega)$$

To accomplish this, calculate the values at the surface according to Equation 4.

$$S_s(x,y,z=0,\omega) = \sum_i a_i S_i(x,y,z=0,\omega) \qquad \text{Equation 4}$$

and $$R_s(x,y,z=0,\omega) = \sum_i a_i R_i(x,y,z=0,\omega)$$

The functions $S_s(\underline{x},\omega)$ and $R_s(\underline{x},\omega)$ can be obtained by integrating the one way wave equations with the summed values at the surface. A complication arises, however, when $S_s(\underline{x},\omega)$ and $R_s(\underline{x},\omega)$ are processed with the imaging condition. Cross terms between seismic records produce artifacts in the image. For example, when two seismic records are summed, the image is given by Equation 5.

$$I_S(\underline{x}) = I_1(\underline{x}) + I_2(\underline{x}) + \qquad \text{Equation 5}$$
$$\sum_{k=1}^{N\omega} [S_1^*(\underline{x},\omega_k) R_2(\underline{x},\omega_k) + S_2^*(\underline{x},\omega_k) R_1(\underline{x},\omega_k)]$$

The first two terms on the right hand side are the same as if the individual images were summed. The other terms, however, are undesirable cross terms.

The present invention comprises phase encoding the seismic records to minimize the effect of the undesirable cross terms. The seismic records are phase encoded with different phase functions before combination and migration, as shown in Equations 6 and 7.

$$S_s(x,y,z=0,\omega) = e^{i\gamma_1(\omega)} S_1(x,y,z=0,\omega) + e^{i\gamma_2(\omega)} S_2(x,y,z=0,\omega) \qquad \text{Equation 6}$$

$$R_s(x,y,z=0,\omega) = e^{i\gamma_1(\omega)} R_1(x,y,z=0,\omega) + e^{i\gamma_2(\omega)} R_2(x,y,z=0,\omega) \qquad \text{Equation 7}$$

In Equations 6 and 7, $\gamma_1(\omega)$ and $\gamma_2(\omega)$ are two different phase functions, one for each seismic record to be combined and migrated. If more than two seismic records are to be combined and migrated, then each additional seismic record has its own phase function, and Equations 6 and 7 are extended accordingly. Due to linearity, the resulting wavefields are similar in form to Equations 6 and 7. Introducing the combined wavefields into the imaging condition results in an image as given by Equation 8.

$$I_S(\underline{x}) = \qquad \text{Equation 8}$$
$$I_1(\underline{x}) + I_2(\underline{x}) + \sum_k \begin{bmatrix} S_1^*(\underline{x},\omega_k) R_2(\underline{x},\omega_k) e^{i(\gamma_2(\omega_k) - \gamma_1(\omega_k))} + \\ S_2^*(\underline{x},\omega_k) R_1(\underline{x},\omega_k) e^{i(\gamma_1(\omega_k) - \gamma_2(\omega_k))} \end{bmatrix}$$

The phase functions $\gamma_1(\omega)$ and $\gamma_2(\omega)$ only appear in the cross terms, and not in the terms producing $I_1$ and $I_2$. Consequently, the phase functions $\gamma_1(\omega)$ and $\gamma_2(\omega)$ can be chosen so that the energy from the unwanted cross terms is dispersed throughout the region of interest or shifted out of the region of interest. The region of interest can be a region associated with specific geologic features, for example an oil or gas trap, a salt dome, a fault, a sand formation, or can be any region in the survey domain of particular interest to an analyst.

FIG. 1 is a flow diagram of the method of the present invention as applied to the combination and migration of a plurality n of seismic records 100. The seismic records are typically time traces that have been Fourier transformed to the frequency domain before migration. Other transformations, such as wavelet transforms and Radon transforms, might also be suitable. A corresponding plurality n of phase functions are selected 110, as discussed below. Each seismic record is phase encoded by multiplying the seismic record by/with the corresponding phase function 112, 113. The phase encoded seismic records are combined by summing 114. If time migration or reverse-time migration is used, then the combined records should be inverse-transformed before migration. The combined record is then migrated, using migration techniques known to those skilled in the art 115, producing a migrated record 190. The imaging condition is applied to the migrated record to produce a migrated image 195.

Figure 2:
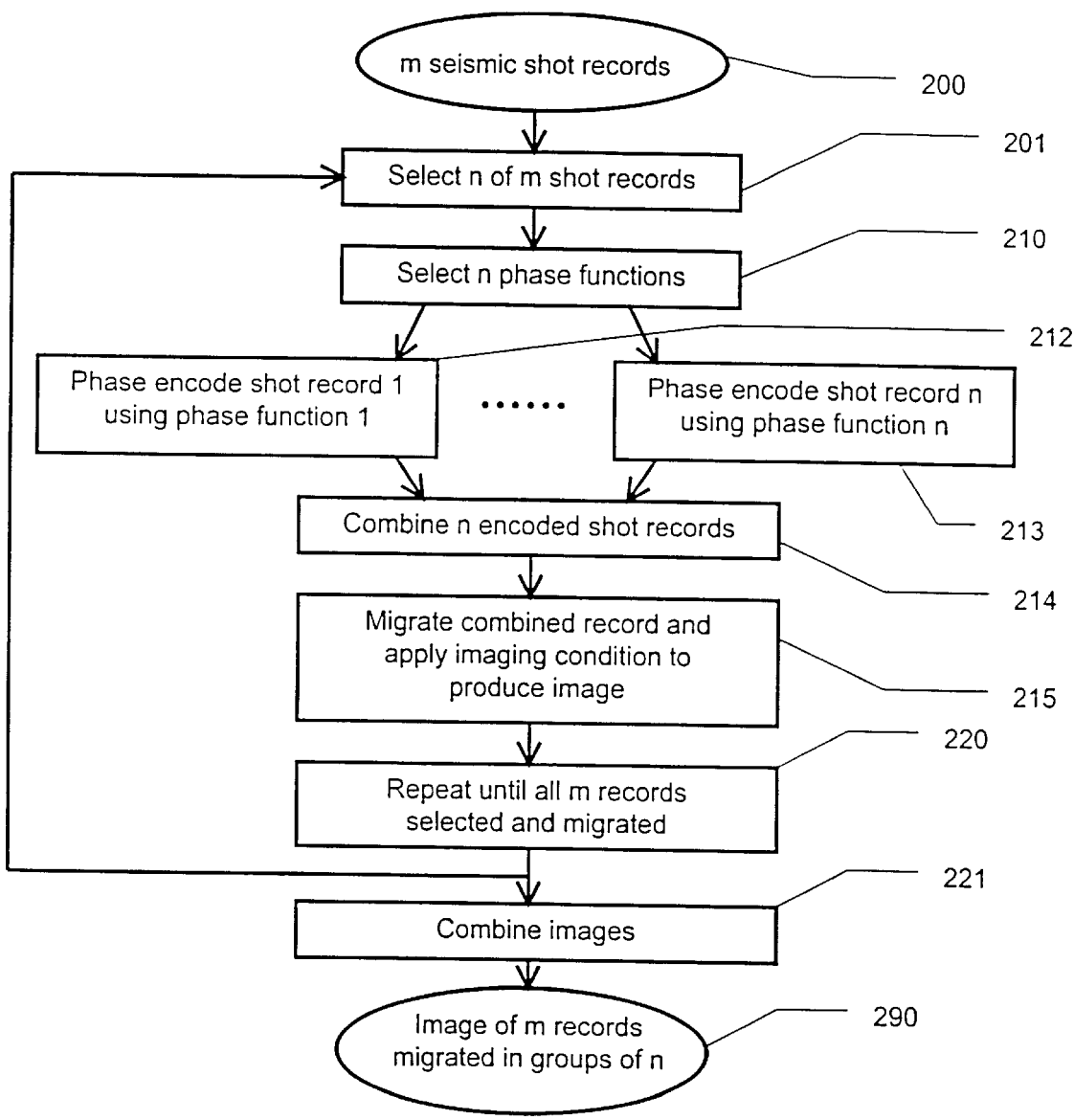
FIG. 2 is a flow diagram of the method of the present invention.

FIG. 2 is a flow diagram of the method of the present invention as applied to the combination and migration of a plurality m of seismic records 200, where m is larger than the number of seismic records desired to combine in a single migration. A second plurality n of seismic records is selected 201 from the first plurality m, where the selected seismic records form a subset of the first plurality m of seismic records. A plurality n of phase functions, corresponding to the second plurality n of seismic records, are selected 210, as discussed below. Each selected seismic record is phase encoded by multiplying the seismic record by the corresponding phase function 212, 213. The phase encoded seismic records are combined by summing 214. The combined record is then migrated, using migration techniques known to those skilled in the art 215. The process is performed multiple times 220, until all of the first plurality m of seismic records have been selected, phase encoded, migrated, and imaged. The multiple passes through the process can be performed sequentially or in parallel. Less than all the first plurality m of seismic records can be selected, phase encoded, migrated, and imaged, if that yields the desired information. The images produced are combined 221, producing a final image 290.

SELECTION OF SEISMIC RECORDS TO ENCODE AND COMBINE

Selecting seismic records for combination properly can reduce the unwanted crossterms. Generally, increased physical separation between the seismic records to be combined leads to reduced crossterms. However, increased physical separation also increases the physical domain, consequently increasing the computation cost of the migration. These two characteristics can be balanced, for example by defining an aperture of interest containing particular underground features, then selecting seismic records for combination that are as far apart as possible but not outside the aperture of interest.

SELECTION OF PHASE FUNCTION

A discussion of imaging condition properties is presented below to help illustrate how to select phase functions for use with the present invention. Discussions of several suitable phase functions follows. Additional discussion of related issues can be found in "Faster shot-record depth migrations using phase encoding", Morton et a., Society of Exploration Geophysicists International Exposition and Sixty-eighth Annual Meeting, 1998, incorporated herein by reference.

Imaging Condition Properties

Suppose a shot is set off at a point $\underline{\eta}=(\eta_1,\eta_2,0)$ on the surface, and the signal is received at a point $\underline{\xi}=(\xi_1,\xi_2,0)$ on the surface at a time $\tau(\underline{\xi},\underline{\eta})$ later. If $\phi(\underline{x},\underline{q})$ is the travel time from a point $\underline{q}$ on the surface to a point $\underline{x}$ in the interior of the earth, then Equations 9, 10, and 11 must hold for a point $\underline{x}$ on a reflecting surface $$\phi(\underline{x}, \underline{\xi}) + \phi(\underline{x}, \underline{\eta}) - \tau(\underline{\xi}, \underline{\eta}) = 0 \qquad \text{Equation 9}$$

$$\frac{\partial}{\partial \xi_1}(\phi(\underline{x}, \underline{\xi}) - \tau(\underline{\xi}, \underline{\eta})) = 0 \qquad \text{Equation 10}$$

$$\frac{\partial}{\partial \xi_2}(\phi(\underline{x}, \underline{\xi}) - \tau(\underline{\xi}, \underline{\eta})) = 0 \qquad \text{Equation 11}$$

For a given value of $\underline{\eta}$ (a particular shot), Equations 9–11 limit $\underline{x}$ to lie on a surface. Equations 9–11 are equivalent to requiring that the point $\underline{x}$ is compatible with Fermat's principle. Equations for the surface can be written as in Equations 12 and 13.

$$\psi(\underline{x},\underline{\eta})+\omega(\underline{x},\underline{\eta})=0 \qquad \text{Equation 12}$$

where $$\psi(\underline{x},\underline{\eta})=\omega(\underline{x},\underline{\xi}(\underline{x},\underline{\eta}))-\tau(\underline{\xi}(\underline{x},\underline{\eta}),\underline{\eta}) \qquad \text{Equation 13}$$

$\psi$ is the remaining time after accounting for travel from the source $\underline{\eta}$ to $\underline{x}$.

A large amplitude occurs in the image any time Equation 12 holds. This is also true for the phase function terms which generate the cross terms. The image can be expressed as in Equation 14.

$$I(\underline{x}) \approx \sum_{k=-N_\omega}^{N_\omega} \Delta\omega F(k\Delta\omega)e^{-ik\Delta\omega(\psi(\underline{x},\underline{\eta})+\phi(\underline{x},\underline{\eta}))} \qquad \text{Equation 14}$$

Large response in the image will occur at any point where Equation 15 holds (m is an integer).

$$\psi(\underline{x}, \underline{\eta}) + \phi(\underline{x}, \underline{\eta}) = \frac{2\pi m}{\Delta\omega} \qquad \text{Equation 15}$$

Large responses for m≠0 lead to aliased images. Selection of phase functions to shift or disperse the cross terms is limited: shifting too far leads to aliasing of the cross terms, returning them to the imaging domain. The maximum value of the cross terms can be made small, even without reducing the total energy contained in the cross terms. Specifically, for the case where $F(\omega)$ is a square pulse and where phase $\gamma(\omega)$ is chosen to optimally disperse the cross terms, the ratio of the dispersed signal H to the maximum value of the non-dispersed signal $H_0$ is given by Equation 16.

$$\frac{H}{H_0} = \sqrt{\frac{\Delta\omega}{2\omega_0}} \qquad \text{Equation 16}$$

In general, $\omega_0\delta t \approx 2\pi$, where $\delta t$ is the width of the seismic pulse that is sent out. Similarly $\Delta\omega\tau_{max} \approx 2\pi$ where $\tau_{max}$ is the maximum recorded arrival time. It follows that if the square root of the pulse width divided by the maximum arrival time is small, $\sqrt{\delta t/\tau_{max}}$, assuming $\delta t \approx dt$ therefore $\sqrt{\delta t/\tau_{max}} \approx 1/\sqrt{N_\omega}$, then the cross terms can be effectively dispersed.

LINEAR PHASE ENCODING

Selection of linear phase functions can completely eliminate the unwanted cross terms provided the sampling rate in the frequency domain is high enough. The required sampling rate for two shots is twice that required to prevent aliasing (the rate typically used in seismic imaging). Two shots of the Marmousi model were phase encoded with a linear phase shift and migrated. The resulting image is shown in FIG. 4(a). For comparison, FIG. 3 shows the image resulting from the same two shots migrated and stacked conventionally. The resulting image is very similar to that obtained with convention migration except near the surface where the cross-correlation artifacts appear as noise in the encoded image. Linear phase shift encoding can be extended to more than two shots by using $\gamma_j(\omega)=(T * j * \omega)/(K-1)$, where j is the shot number (0,1, . . . K−1), T is the Fourier transform length in seconds, and K is the number of shots to be encoded.

RANDOM PHASE ENCODING

Selection of random phase functions can disperse the unwanted cross terms. The phase functions $\gamma_1(\omega)$ and $\gamma_2(\omega)$ can be selected to be a sequence of random numbers between 0 and $2\pi$. The phases randomly line up when summing over $\omega$ to produce an image, and consequently should not produce a large response for any values of $\omega$. For phase encoding and combining more than two seismic records the phase functions can be selected so that each seismic record gets a new sequence of random phases, one for each frequency. For example, $\gamma_1(\omega)$ can be $\gamma_1(\omega_1)=_1\times2\pi$, $\gamma_1(\omega_2)=_2\times2\pi$, . . . $\gamma_1(\omega_n)=_n\times2\pi$, and $\gamma_2(\omega)$ can be $\gamma_2(\omega_1)=_{n+1}\times2\pi$, $\gamma_2(\omega_2)=_{n+2}\times2\pi$, . . . $\gamma_2(\omega_n)=_{n+n}\times2\pi$, where each $_i$ is a random number between 0 and 1. Two shots of the Marmousi model were phase encoded using random phase encoding and migrated. The resulting image is shown in FIG. 4(b).

CHIRP PHASE ENCODING

Selection of phase function to be a chirp can also disperse the unwanted cross terms. Specifically, the phase function γ(ω) can be selected to be the linear FM chirp γ(ω)=βω². For phase encoding and combining more than two seismic records the phase functions can be selected to be the sequence of phases γ$_1$(ω)=0, γ$_2$(ω)=βω², γ$_3$(ω)=2βω², . . . γ$_K$(ω)=(K−1)βω². The constant β needs to be selected carefully in order to prevent aliasing (i.e., (K−1)β<π/(ω$_0$Δω) where ω$_0$ is the bandwidth of the signal and Δω is the difference between frequencies from the FFT). Chirp phase encoding disperses the unwanted cross terms similarly as random phase encoding. Image artifacts due to unwanted cross terms can appear more periodic with chirp phase encoding than with random phase encoding. Two shots of the Marmousi model were phase encoded using chirp phase encoding and migrated. The resulting image is shown in FIG. 4(c).

MODIFIED CHIRP PHASE ENCODING

Modified chirp phase encoding also disperses the unwanted crossterms, but through an optimization process, using γ(ω)=βr(ω). The function r(ω) is determined using a method of stationary phase and requires knowledge of the source wavelet, F(ω). The variable, β, is specified by $$\beta < 2\pi \left/ \left( \Delta\omega \int_0^\infty |F(u)|^2 \, du \right) \right.$$

in order to prevent aliasing. As an example, if F(ω)=ωλ exp(−½λω²), then r(ω)=q(√+e,fra λ+ee ω), where $$q(\xi) = \frac{\sqrt{\pi}}{4} \xi \operatorname{erf}(\xi) + \frac{\exp(-\xi^2)}{2}$$

and $$\beta < \frac{2\sqrt{\pi}}{\Delta\sqrt{\lambda}}.$$

Two shots of the Marmousi model were phase encoded using a modified chirp phase encoding and migrated. The resulting image is shown in FIG. 4(d).

IMPLEMENTATION

The present invention can be practiced using computer hardware and software techniques familiar to those skilled in the art. Table 1 lists pseudocode suitable for practice of the current invention on conventional computers.

TABLE 1

```
for all the records to be migrated
{
   for each record to be encoded
      (selected subset from records to be migrated)
   {
      read source/receiver time traces
      FFT source and receiver data
      select and generate phase function
      phase encode source and receiver data
   }
   combine (sum) the encoded, selected records
   inverse FFT encoded source and receiver data
      (if doing time migration or reverse-time migration)
   migrate the combined record
   sum migrated image with current image
   save migrated image and current image
```

TABLE 1-continued

```
}
```

EXAMPLE RESULTS

All 240 shots from the Marmousi model were selected, phase encoded, combined, and migrated to illustrate the effects of the present invention. FIG. 5 shows the result using conventional migration, imaging, and stacking (using a single shot per migration).

In FIG. 6(a,b,c,d), images resulting from encoding schemes with two shots per migration are shown (i.e., the 240 shots were migrated in sets of two for a total of 120 migrations). On the left is shown the resulting encoded images, and on the right is the difference (amplified by a factor of 10) between the encoded images and the image generated through conventional imaging and stacking shown in FIG. 5.

FIG. 6(a) shows the migrated image for linear shift encoding. The artifacts near the surface appear to be random in nature. However, the deeper artifacts appear to be coherent structures in the image which could be mistaken for a true event.

FIG. 6(b) shows the migrated image for random encoding. The artifacts for this image are "randomly" dispersed throughout the image. This apparent noise in the image has short wavelengths near the surface and longer wavelengths at deeper locations.

FIG. 6(c) shows the migrated image for chirp encoding. The cross terms in this image have larger amplitudes in comparison with the other methods shown in FIG. 6. Additionally the cross terms have coherent structures which appear to be periodic.

FIG. 6(d) shows the migrated image for modified-chirp encoding. The migrated image is very similar to the chirp-encoded image. Like the chirp-encoded image, the artifacts are periodic and could be mistaken for a true event.

Overall these encoding schemes for two seismic records per migration perform very well and introduce only slight artifacts to the final image (remember the differences shown in FIG. 6 have been amplified by 10). These runs took half as long as those for the conventional imaging and stacking, thus substantial savings in runtime is possible.

Further savings in runtime can be obtained if more than two seismic records can be phase encoded. A relative L2-norm of the difference between images, as in Equation 17, can measure the amount of noise generated by the encoding schemes. The L2-norm difference does not point out features such as the packing of artifacts near the surface or if artifacts are periodic.

$$\frac{\|I_{encoded} - I_{not\text{-}encoded}\|}{\|I_{not\text{-}encoded}\|} \quad \text{Equation 17}$$

FIG. 7 shows the relative L2-norm differences for the phase encoding schemes tested. Trivial encoding, where the combined seismic records are simply separated by large distances, is the best performer for less than 20 seismic records per migration. However this approach will not save any computation because of the increased computational domain.

Linear-shift encoding does very well for 2 and 4 seismic records per migration but is relatively the worst at higher numbers of seismic records per migration. This might be primarily due to trace length, which would limit the usefulness of linear-phase-shift encoding. The random encoding performs relatively poorly at two seismic records per migration, but improves with more seismic records per migration. With random phase encoding the cross-term energy is randomly dispersed throughout the image and therefore will not likely introduce events which could be misinterpreted.

Chirp encoding does poorly at two seismic records per migration, but appears to perform better with more seismic records per migration. The periodic character of the chirp encoding can make interpretation of the final image difficult. For two seismic records per migration, the modified-chirp encoding does better than chirp-encoding. The modified-chirp encoding does worse with more seismic records per migration, however.

The random encoding appears to be a good choice for higher number of seismic records per migration because of its lack of coherent structures, as can be seen in FIG. 8($a,b,c,d$). As the number of seismic records is increased, the cross-term energy grows in strength. However even with all 240 shots of the Marmousi model encoded, some major features can still be seen. The computational costs for these images decreases dramatically because of the fewer migrations are required. The image in FIG. 8($d$) took about $\frac{1}{240}$ the time to generate versus the image in FIG. 5.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method of migrating first and second seismic records, comprising:
    a) forming a first encoded seismic record by phase encoding said first seismic record;
    b) forming a second encoded seismic record by phase encoding said second seismic record;
    c) forming a combined record by combining said first encoded seismic record and said second encoded seismic record; and
    d) forming a migrated record by migrating said combined record.

2. The method of claim 1, wherein:
    i) phase encoding said first seismic record comprises multiplying said first seismic record by a first phase function;
    ii) phase encoding said second seismic record comprises multiplying said second seismic record by a second phase function; and
    iii) said first phase function and said second phase function are selected so that noise introduced into a region of interest by crosscorrelations between said first encoded seismic record and said second encoded seismic record is less than or equal to signal associated with true events.

3. The method of claim 1, wherein:
    i) phase encoding said first seismic record comprises multiplying said first seismic record by a first phase function;
    ii) phase encoding said second seismic record comprises multiplying said second seismic record by a second phase function; and
    iii) said first phase function and said second phase function are selected from the group consisting of: linear phase, random phase, chirp phase, and modified chirp phase.

4. The method of claim 1, wherein migrating said combined record is selected from the group consisting of: Stolt migration, Fourier finite-difference migration, finite-difference migration, phase-shift migration, phase-shift plus interpolation, Gazdag migration, frequency-space migration, split-step migration, Kirchoff migration, and reverse-time migration.

5. The method of claim 1, further comprising generating an image from said migrated record using a correlation imaging condition.

6. A method of migrating a first plurality of seismic records, comprising:
    a) forming a plurality of encoded seismic records by phase encoding each of said seismic records;
    b) forming a combined record by combining said encoded seismic records; and
    c) forming a migrated record by migrating said combined record.

7. The method of claim 6, wherein phase encoding each of said seismic records comprises multiplying each of said seismic records by a corresponding phase function, wherein the corresponding phase functions are selected so that so that noise introduced into a region of interest by crosscorrelations between said encoded seismic records is less than or equal to signal associated with true events.

8. The method of claim 6, wherein phase encoding each of said seismic records comprises multiplying each of said seismic records by a corresponding phase function, wherein the corresponding phase functions are selected from the group consisting of: linear phase, random phase, chirp phase, and modified chirp phase.

9. The method of claim 6, wherein migrating said combined record is selected from the group consisting of: Stolt migration, Fourier finite-difference migration, finite-difference migration, phase-shift migration, phase-shift plus interpolation, Gazdag migration, frequency-space migration, split-step migration, Kirchoff migration, and reverse-time migration.

10. The method of claim 6, further comprising generating an image from said migrated record using a correlation imaging condition.

11. A method of migrating a plurality of seismic records, comprising:
    a) selecting a first seismic record and a second seismic record from said first plurality of seismic records;
    b) forming a first encoded seismic record by phase encoding said first seismic record;
    c) forming a second encoded seismic record by phase encoding said second seismic record;
    d) forming a combined record by combining said first encoded seismic record and said second encoded seismic record;
    e) forming a migrated record by migrating said combined record; and
    f) repeating steps a) through e) until all of said first plurality of seismic records have been migrated.

12. The method of claim 11, wherein:
    i) phase encoding said first seismic record comprises multiplying said first seismic record by a first phase function;
    ii) phase encoding said second seismic record comprises multiplying said second seismic record by a second phase function; and iii) said first phase function and said second phase function are selected so that so that noise introduced into a region of interest by crosscorrelations between said first encoded seismic record and said second encoded seismic record is less than or equal to signal associated with true events.

13. The method of claim 11, wherein:

i) phase encoding said first seismic record comprises multiplying said first seismic record by a first phase function;

ii) phase encoding said second seismic record comprises multiplying said second seismic record by a second phase function; and iii) said first phase function and said second phase function are selected from the group consisting of: linear phase, random phase, chirp phase, and modified chirp phase.

14. The method of claim 11, wherein migrating said combined record is selected from the group consisting of: Stolt migration, Fourier finite-difference migration, finite-difference migration, phase-shift migration, phase-shift plus interpolation, Gazdag migration, frequency-space migration, split-step migration, Kirchoff migration, and reverse-time migration.

15. The method of claim 11, wherein said first and second seismic records contain information collected from physically separated locations.

16. The method of claim 11, further comprising stacking said migrated images and generating an image therefrom using a correlation imaging condition.

17. A method of migrating a first plurality of seismic records, comprising:

a) forming a second plurality of selected seismic records from said first plurality of seismic records;

b) forming a plurality of encoded seismic records by phase encoding each of said selected seismic records;

c) forming a combined record by combining said encoded seismic records;

d) forming a migrated record by migrating said combined record;

e) repeating steps a) through d) until all of said first plurality of seismic records have been migrated.

18. The method of claim 17, wherein phase encoding each of said seismic records comprises multiplying each of said seismic records by a corresponding phase function, wherein the corresponding phase functions are selected so that so that noise introduced into a region of interest by crosscorrelations between said encoded seismic records is less than or equal to signal associated with true events.

19. The method of claim 17, wherein phase encoding each of said seismic records comprises multiplying each of said seismic records by a corresponding phase function, wherein the corresponding phase functions are selected from the group consisting of: linear phase, random phase, chirp phase, and modified chirp phase.

20. The method of claim 17, wherein migrating said combined record is selected from the group consisting of: Stolt migration, Fourier finite-difference migration, finite-difference migration, phase-shift migration, phase-shift plus interpolation, Gazdag migration, frequency-space migration, split-step migration, Kirchoff migration, and reverse-time migration.

21. The method of claim 17, wherein said plurality of selected seismic records contain information collected from physically separated locations.

22. The method of claim 17, further comprising stacking said migrated records and generating an image therefrom using a correlation imaging condition.

23. The method of claim 1, wherein said first and second seismic records are in the frequency domain.

24. The method of claim 6, wherein said first and second seismic records are in the frequency domain.

25. The method of claim 11, wherein said first and second seismic records are in the frequency domain.

26. The method of claim 17, wherein said first and second seismic records are in the frequency domain.

* * * * *